US010850852B2

(12) United States Patent
Movsesian et al.

(10) Patent No.: US 10,850,852 B2
(45) Date of Patent: Dec. 1, 2020

(54) METHODS FOR ARRANGING PASSENGER SEATS AND PASSENGER SERVICE UNITS IN AIRCRAFT CABINS

(71) Applicant: The Boeing Company, Chicago, IL (US)

(72) Inventors: Sami Movsesian, Glendale, CA (US); Scott E. Nash, Cypress, CA (US)

(73) Assignee: The Boeing Company, Chicago, IL (US)

( * ) Notice: Subject to any disclaimer, the term of this patent is extended or adjusted under 35 U.S.C. 154(b) by 67 days.

(21) Appl. No.: 16/254,467

(22) Filed: Jan. 22, 2019

(65) Prior Publication Data

US 2020/0231286 A1 Jul. 23, 2020

(51) Int. Cl.
*B64D 11/06* (2006.01)
*B64D 11/00* (2006.01)

(52) U.S. Cl.
CPC ........ *B64D 11/0696* (2013.01); *B64D 11/003* (2013.01); *B64D 11/064* (2014.12)

(58) Field of Classification Search
CPC . B64D 11/0696; B64D 11/064; B64D 11/003; B64D 2011/0038; B64D 2011/0053; B64D 2011/0046; B64D 2231/025; B64D 47/02; B64D 2045/007; B64D 11/06; B60N 2/242; B60N 2/01575; B60N 2/01; B60N 2/01558; B64F 5/10; G01C 15/008
See application file for complete search history.

(56) References Cited

U.S. PATENT DOCUMENTS 6,453,568 B1 * 9/2002 Hymer ................ G01C 15/008
33/276
2006/0037205 A1 2/2006 Sergyeyenko et al.
(Continued)

FOREIGN PATENT DOCUMENTS

JP H02279433 A 11/1990

OTHER PUBLICATIONS

"Generic Vertical Horizontal Measurer Laser Line Projection Square Level Laser Level Laser Measurement Tool Right Angle 90 Degree", Jumia, Retrieved from the Internet on Nov. 19, 2018: https://www.jumia.co.ke/generic-vertical-horizontal-measurer-laser-line-projection-square-level-laser-level-laser-measurement-tool-right-angle-90-degree-3188049.html, 7 pgs.
(Continued)

*Primary Examiner* — Jun S Yoo
(74) *Attorney, Agent, or Firm* — Kwan & Olynick LLP

(57) ABSTRACT

Disclosed are methods for arranging passenger seats and passenger service units in aircraft cabins as well as locating devices used in these methods. These methods and devices provide fast and efficient ways for directly referencing the position of each passenger service unit relative to a corresponding passenger seat. For example, a passenger seat is positioned on a seat rail using rail markers. Each set of markers corresponds to a different seating configuration. A locating device is then placed on the passenger seat such that the device datum contacts the seat cushion. A locator of the locating device determines a reference, in an overhead compartment, for installing a passenger service unit, corresponding to this seat. The reference is based on an angle between the datum and the locator, which is adjustable in some examples.

20 Claims, 16 Drawing Sheets

(56) References Cited

U.S. PATENT DOCUMENTS

| | | |
|---|---|---|
| 2011/0071437 A1 | 3/2011 | Merchant |
| 2012/0072079 A1 | 3/2012 | Schliwa et al. |
| 2015/0090839 A1 | 4/2015 | Freund et al. |
| 2015/0166178 A1* | 6/2015 | Savian .................... B60Q 3/44 244/118.6 |
| 2018/0134394 A1* | 5/2018 | Weifenbach ....... B60N 2/01558 |

OTHER PUBLICATIONS

European Application Serial No. 19212726.4, Search Report dated Jul. 6, 2020, 11 pgs.

* cited by examiner

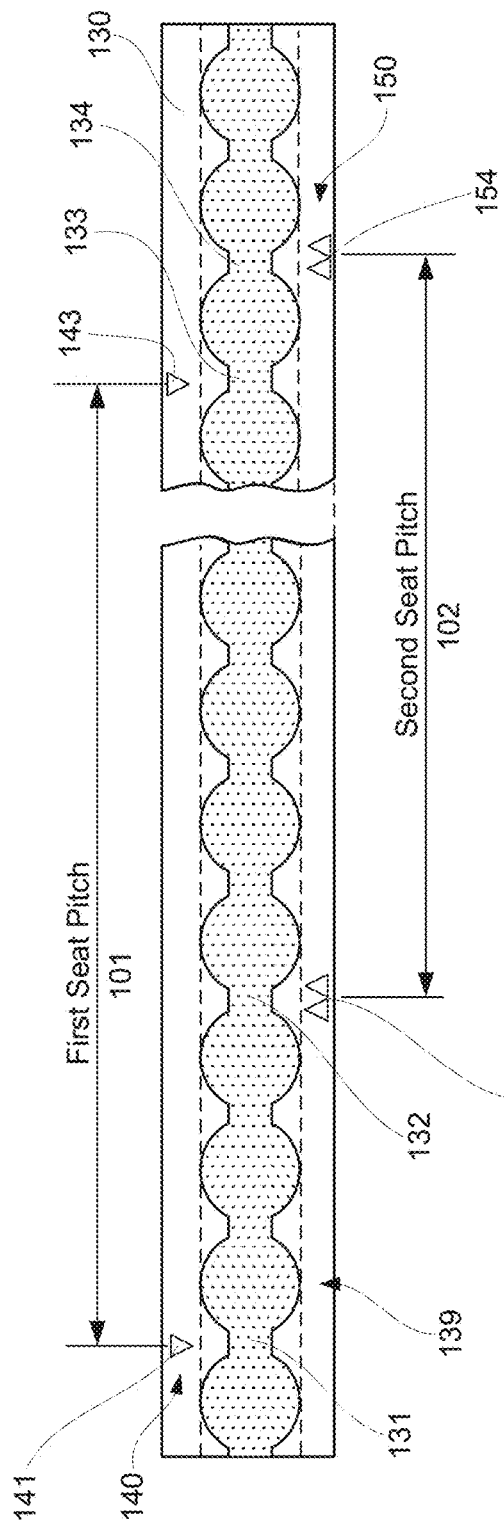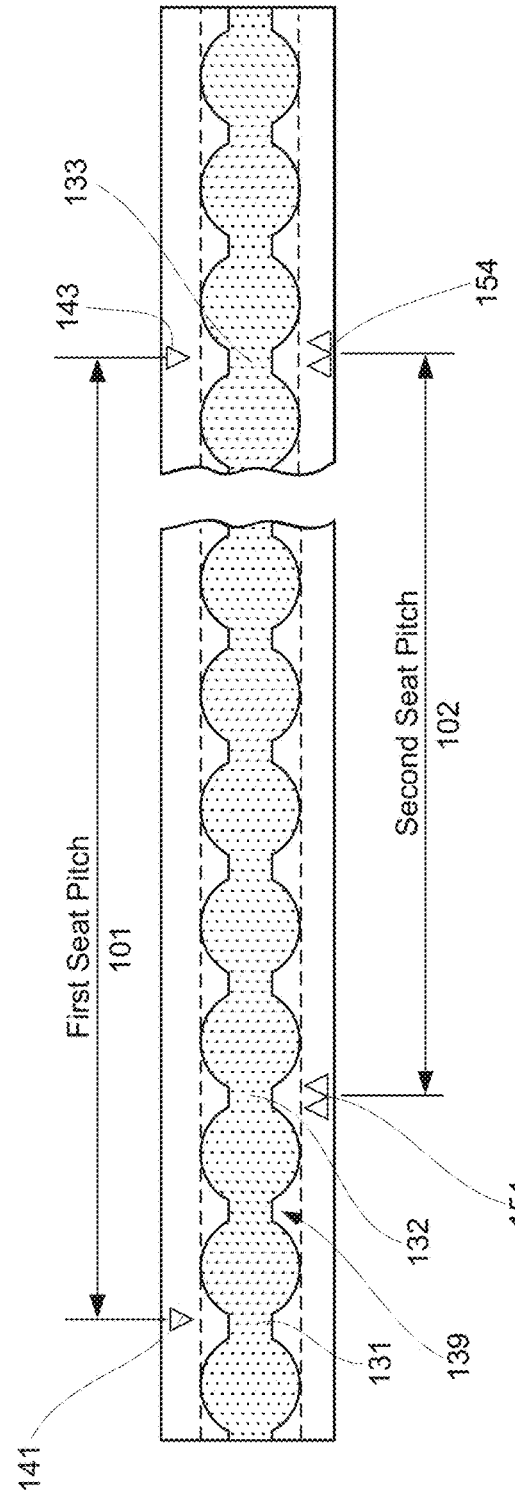

METHODS FOR ARRANGING PASSENGER SEATS AND PASSENGER SERVICE UNITS IN AIRCRAFT CABINS

BACKGROUND

Passenger service units, which are also referred to as PSUs, are used in aircraft cabins to provide various safety and convenience features available to passengers. In some examples, a passenger service unit includes one or more oxygen masks, lights, ventilation fans, and attendant call button and indicators. Passenger service units are typically positioned in overhead compartments of the cabin, above passenger seats. The position of each passenger service unit depends on the position of at least one passenger seat to ensure that the passenger service unit is within the reach of a passenger in that seat. For example, one seat in row of seats serviced by the same passenger service unit is used as a reference.

Seat positions in an aircraft cabin can be changed during operation of the aircraft. For example, the aircraft capacity may be increased or decreased based on seasonal demands and/or new routes. Different seat capacities correspond to different seating configurations and, more specifically, to different pitches between seats in adjacent rows. Moving a seat to a new position often requires changing the position of the corresponding passenger service unit to ensure accessibility of that passenger service unit by passengers.

Currently, the position of each seat and, separately, of each passenger service unit is referenced to various structural components in the cabin, such as fuselage components. These components are stationary and provide fixed references for new positions of the passenger seats and of the passenger service units. For example, an aircraft operator is supplied with documentations showing different seating configurations available for the aircraft cabin. Each configuration includes a referenced position of each seat and, separately, a referenced position of each passenger service unit relative to different structural components. This documentation is used to change the seating configuration, which involves repositioning of seats and corresponding passenger service units. For clarity, it should be noted that the passenger service units are referenced to structural components of the cabin rather than to seats in these conventional seating configuration documents. Such cabin reconfiguration processes are slow and can take multiple days to complete in large aircraft cabins, often designed to carry hundreds of passengers. Aircraft operators are interested in minimizing this time, during which aircraft is not operated.

What is needed are methods and systems for arranging passenger seats and passenger service units in aircraft cabins in fast and efficient manner.

SUMMARY

Disclosed are methods for arranging passenger seats and passenger service units in aircraft cabins as well as locating devices used in these methods. These methods and devices provide fast and efficient ways for directly referencing the position of each passenger service unit relative to a corresponding passenger seat. For example, a passenger seat is positioned on a seat rail using rail markers. Each set of markers corresponds to a different seating configuration. A locating device is then placed on the passenger seat such that the device datum contacts the seat cushion. A locator of the locating device determines a reference, in an overhead compartment, for installing a passenger service unit, corresponding to this seat. The reference is based on an angle between the datum and the locator, which is adjustable in some examples.

Illustrative, non-exclusive examples of various inventive features according to the present disclosure are described in the following enumerated paragraphs:

A1. Method 200 for arranging a set of passenger seats 110, comprising passenger seat 111, and a set of passenger service units 120, comprising passenger service unit 121, in aircraft cabin 100, comprising seat rail 130, method 200 comprising:

aligning support fitting 115 of passenger seat 111 with first receiver 131 of receiver set 139 on seat rail 130,
wherein seat rail 130 comprises first marker set 140, each identifying one receiver in receiver set 139 such that any two adjacent markers in first marker set 140 are spaced apart by first seat pitch 101, and
wherein first receiver 131 is identified by first marker 141 of first marker set 140;

positioning a locating device 170 on passenger seat 111 such that device reference point 179 of locating device 170 coincides with seat cushion reference point 119 of passenger seat 111 and such that device datum 176 of locating device 170 is positioned on and in contact with seat cushion 116 of passenger seat 111, and using front locator 171 of locating device 170, determining first front reference 191 in overhead compartment 190 for installing passenger service unit 121, corresponding to passenger seat 111,
wherein first front reference 191 depends on first angle 161 between device datum 176 and front locator 171, and
wherein first angle 161 is selected based on distance 163 between device datum 176 and passenger service unit 121 and further based on first seat pitch 101.

A2. Method 200 of paragraph A1, wherein angle 164 between device datum 176 and front locator 171 is adjustable.

A3. Method 200 of paragraph A2, further comprising adjusting angle 164 between device datum 176 and front locator 171.

A4. Method 200 of any one of paragraphs A1-A3, further comprising determining first angle 161 at least based on distance 163 between device datum 176 and passenger service unit 121 and further based on first seat pitch 101.

A5. Method 200 of any one of paragraphs A1-A4, wherein first angle 161 between device datum 176 and front locator 171 is further selected based on height 196 of back rest 117 of passenger seat 111 and recline angle 195 of back rest 117.

A6. Method 200 of any one of paragraphs A1-A5, wherein front locator 171 comprises one of laser pointer 172 or extendable arm 173.

A7. Method 200 of any one of paragraphs A1-A6, further comprising, using rear locator 174 of locating device 170, determining first rear reference 192 in overhead compartment 190 for positioning passenger service unit 121, wherein passenger service unit 121 is positioned between first front reference 191 and first rear reference 192.

A8. Method 200 of paragraph A7, wherein angle 165 between device datum 176 and rear locator 174 is fixed.

A9. Method 200 of paragraph A8, wherein angle 165 between device datum 176 and rear locator 174 is determined based on the type of passenger seat 111.

A10. Method 200 of paragraph A7, wherein rear locator 174 is positioned against back rest 117 of passenger seat 111 while device reference point 179 of locating device 170 coincides with seat cushion reference point 119 and device datum 176 is positioned against seat cushion 116 of passenger seat 111.

A11. Method 200 of any one of paragraphs A1-A10, further comprising, installing passenger service unit 121 in overhead compartment 190 at least in accordance with first front reference 191.

A12. Method 200 of paragraph A11, wherein front edge of passenger service unit 121 is aligned with first front reference 191.

A13. Method 200 of paragraph A11, further comprising installing one or more filler panels 180, such that one or more filler panels 180 are positioned between passenger service unit 121 and second passenger service unit 122, adjacent to passenger service unit 121.

A14. Method 200 of paragraph A13, wherein first front reference 191 comprises two reference points 198, separated by reference distance 199.

A15. Method 200 of paragraph 14, wherein reference distance 199 is greater than width 189 of a narrow-most filler panel of one or more filler panels 180.

A16. Method 200 of paragraph 15, wherein at least two of one or more filler panels 180 have different widths.

A17. Method 200 of any one of paragraphs A1-A16, wherein seat rail 130 comprises second marker set 150, each identifying one receiver in receiver set 139 such that any two adjacent markers in second marker set 150 are spaced apart by second seat pitch 102, different from first seat pitch 101.

A18. Method 200 of paragraph A17, further comprising:
  aligning support fitting 115 of passenger seat 111 with second receiver 132 of receiver set 139 on seat rail 130,
    wherein second receiver 132 is identified by a second marker 151 of second marker set 150;
  positioning locating device 170 on passenger seat 111 such that device reference point 179 of locating device 170 coincides with seat cushion reference point 119 of passenger seat 111 and such that device datum 176 of locating device 170 is positioned on and in contact with seat cushion 116 of passenger seat 111; and
  using front locator 171 of locating device 170, determining second front reference 197 in overhead compartment 190 for installing passenger service unit 121, corresponding to passenger seat 111,
    wherein second front reference 197 is determined by a second angle 162 between device datum 176 and front locator 171,
    wherein second angle 162 is selected based on a distance 163 between device datum 176 and passenger service unit 121 and further based on second seat pitch 102.

A19. Method 200 of paragraph A18, wherein second angle 162 is different from first angle 161.

A20. Method 200 of paragraph A19, further comprising, installing passenger service unit 121 in overhead compartment 190 at least in accordance with second front reference 197.

B1. Locating device 170 for determining position of passenger service unit 121 relative to passenger seat 111 in aircraft cabin 100, locating device 170 comprising:
  device datum 176, for positioning on and in contact with seat cushion 116 of passenger seat 111;
  front locator 171, connected and positioned at angle 164 relative to device datum 176, and configured to determine first front reference 191 in overhead compartment 190; and
  device reference point 179, identified by at least one of device datum 176 or front locator 171 and configured to coincide with seat cushion reference point 119 of passenger seat 111 when device datum 176 of locating device 170 is positioned on and in contact with seat cushion 116 of passenger seat 111.

B2. Locating device 170 of paragraph B1, wherein angle 164 between device datum 176 and front locator 171 is adjustable.

B3. Locating device 170 of any one of paragraphs B1-B2, wherein front locator 171 comprises one of a laser pointer 172 or an extendable arm 173.

B4. Locating device 170 of any one of paragraphs B1-B3, further comprising rear locator 174, connected to device datum 176 and front locator 171 and configured to determine first rear reference 192 in overhead compartment 190, such that distance between first front reference 191 and first rear reference 192 are substantially equal to the length of passenger service unit 121.

B5. Locating device 170 of paragraph B4, wherein angle 165 between device datum 176 and rear locator 174 is fixed.

BRIEF DESCRIPTION OF THE DRAWINGS

FIGS. 2B and 2C are schematic illustrations of seat rails, showing different examples of markers on these seat rails.

DETAILED DESCRIPTION

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

INTRODUCTION

Fast and efficient methods and tools for rearranging passenger seats and passenger service units in aircraft cabins are essential for reducing the aircraft downtime. Aircraft operators often need to implement new seating configuration, thereby increasing or decreasing the seating capacity in the aircraft cabin, in response to demand fluctuations (e.g., seasonal adjustment), new routes, and the like. Since conventional methods of rearranging passenger seats and passenger service units take long time, often multiple days, aircraft operators are forced to select between reducing the aircraft downtime and using the most desired seating configuration. Methods and tools described herein provide substantially reduction in the time for arranging passenger seats and passenger service units, thereby allowing these aircraft operators to use desired seating configurations more frequently.

Figure 1A:
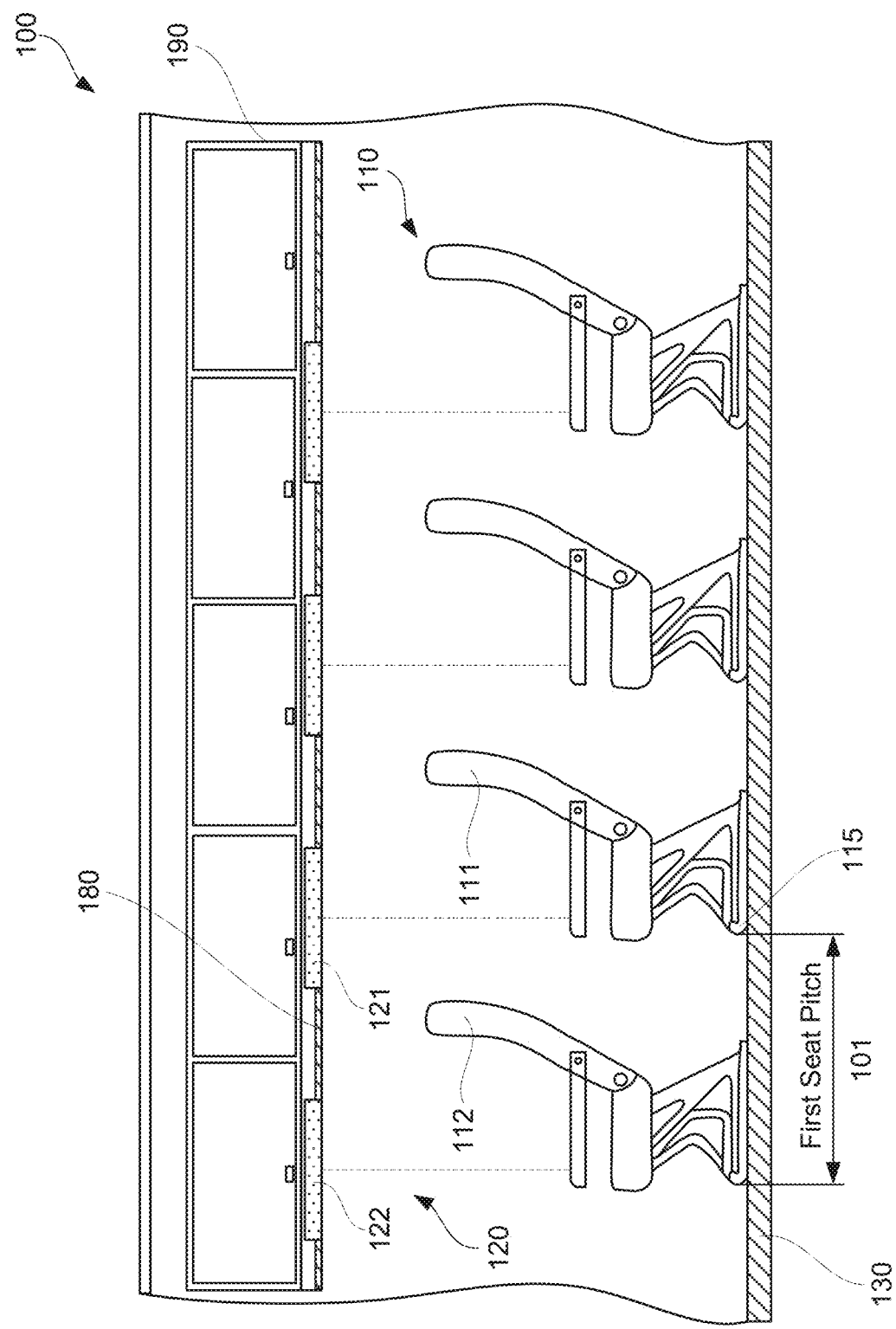
FIG. 1A is a schematic illustration of an aircraft cabin, showing passenger seats spaced apart by a first seat pitch, in accordance with some examples.

FIG. 1A is a schematic illustration of aircraft cabin 100, comprising passenger seats 110 arranged into rows and spaced apart by first seat pitch 101, at least in this example. Specifically, passenger seat 111 and second passenger seat 112 are two adjacent seats, each having a reference point such as support fittings. The distance between these reference points of passenger seat 111 and second passenger seat 112 is equal to first seat pitch 101. In general, any reference point can be used to determine the seat pitch. The seat pitch corresponds to a specific seating configuration. When passenger seats 110 are rearranged into a new seating configuration, the seat pitch is changed in some examples, as further described with reference to FIG. 1B.

Referring to FIG. 1A, passenger seats 110, including passenger seat 111 and second passenger seat 112, are supported on and attached to seat rail 130. While schematic side views of FIGS. 1A-D illustrate only one seat rails, one having ordinary skill in the art would understand that multiple rails are often used to support various seat sets. Furthermore, referring to FIG. 1A, each passenger seat has a corresponding passenger service unit, positioned in overhead compartment 190 in aircraft cabin 100. One having ordinary skill in the art would understand that the same passenger service unit is often used for multiple seats positioned in the same row, e.g., two, three, or more seats. However, seats positioned in different rows, such as passenger seat 111 and second passenger seat 112 use different passenger service units. As shown, passenger service unit 121 corresponds to passenger seat 111, while second passenger service unit 122 corresponds to second passenger seat 112. The alignment between passenger seat 111 and passenger service unit 121 allows a passenger in passenger seat 111 to access various components and features in passenger service unit 121. The gap between passenger service unit 121 and second passenger service unit 122 is covered by one or more filler panels 180.

Figure 1B:
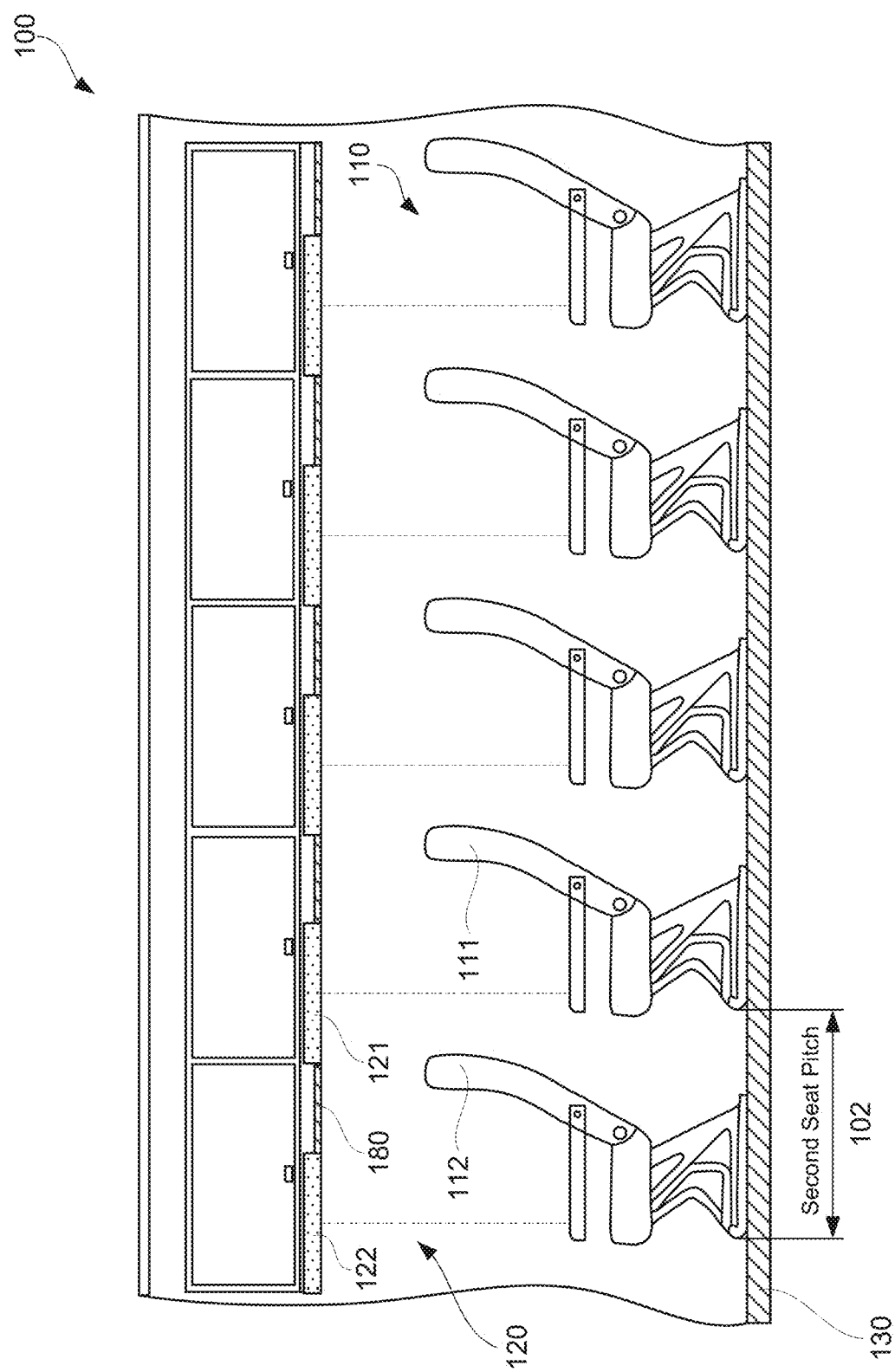
FIG. 1B is a schematic illustration of the aircraft cabin of FIG. 1A, now showing the passenger seats spaced apart by a second seat pitch, which is different from the first seat pitch.

FIG. 1B is a schematic illustration of aircraft cabin 100, in which passenger seats 110 are spaced apart by second seat pitch 102, which is different than first seat pitch 101 shown in FIG. 1A and described above. Specifically, the distance between the reference points of passenger seat 111 and second passenger seat 112, e.g., their support fittings, is now equal to second seat pitch 102. It should be noted that the pitch between passenger service unit 121 land second passenger service unit 122 for this seating configuration is also different in this seating configuration than that shown in FIG. 1A. In some examples, the pitch between passenger service unit 121 and second passenger service unit 122 is substantially equal to the corresponding seat pitch, e.g., within 25%, within 10%, or even within 5%. It should be noted that the gap between passenger service unit 121 and second passenger service unit 122 depends on the pitch between passenger service unit 121 and second passenger service unit 122 and the lengths of passenger service unit 121 and second passenger service unit 122. This gap is covered by one or more filler panels 180. As such, in some examples, a different set of filler panels 180 is needed for different seating configurations.

Figure 1C:
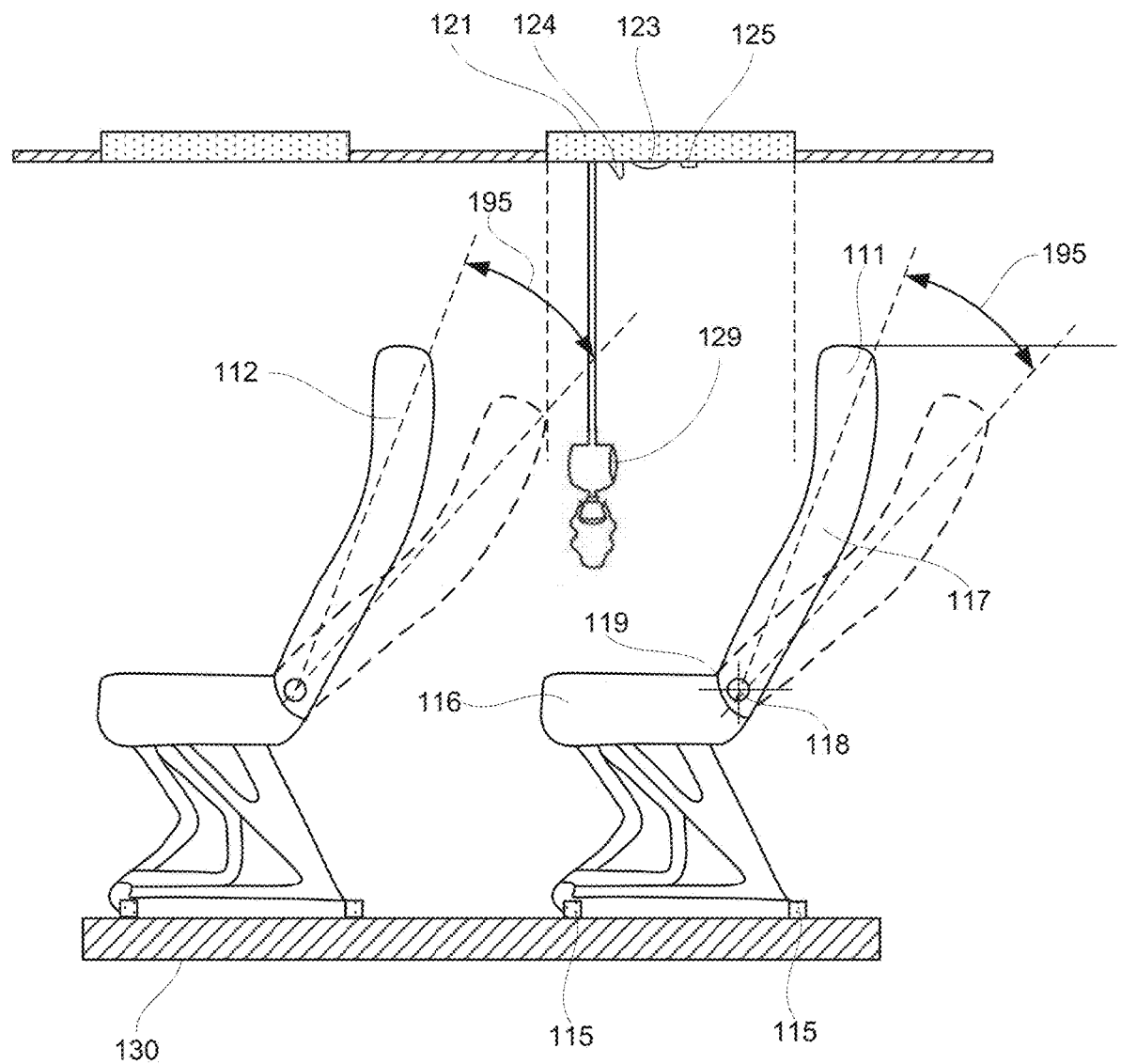
FIG. 1C is a schematic illustration of two adjacent passenger seats, showing the position and accessibility of a passenger service unit, corresponding to the rear passenger seat, in accordance with some examples.

FIG. 1C is a schematic illustration of two adjacent passenger seats, showing the space between these passenger seats available for accessing the passenger service unit corresponding to the rear seat. For purposes of this disclosure, adjacent passenger seats are referred to as seats positioned in adjacent rows, usually behind one another, and offset relative to each other along seating rail 130. As noted above, this offset is referred to as a seat pitch.

Figure 3:
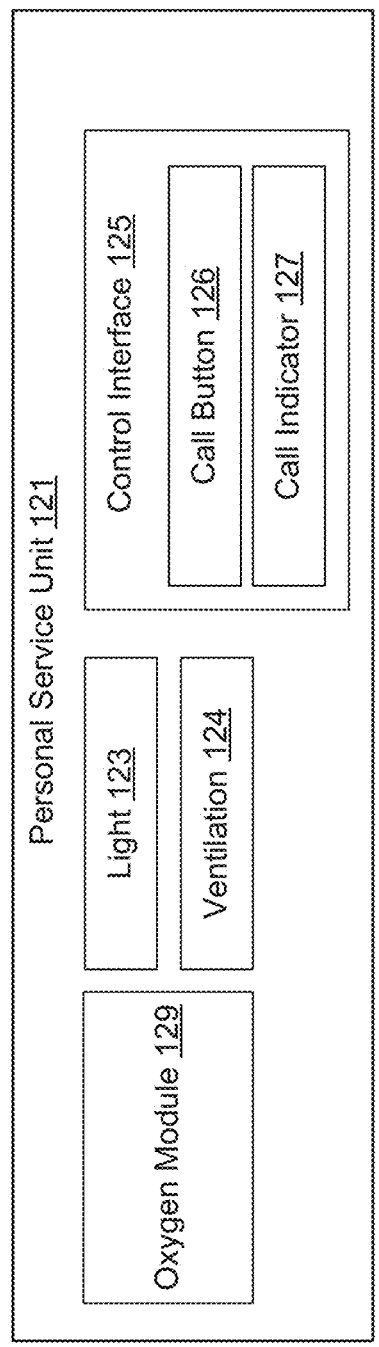
FIG. 3 is a block diagram of the passenger service unit, in accordance with some examples.

FIG. 1C illustrates passenger seat 111, second passenger seat 112, and passenger service unit 121, which correspond to passenger seat 111. Dashes lines extending to passenger service unit 121 represent an accessibility zone. This zone may be impacted by illustrates passenger seat 111 and/or second passenger seat 112 being reclined. Passenger service unit 121 comprises light 123, ventilation 124, control interface 125, and oxygen module 129. Additional details of passenger service unit 121 are presented in FIG. 3. Specifically, in some examples, control interface 125 includes call button 126 and call indicator 127. Alternative, one or more or even all components of control interface 125 are positioned in passenger seat 111, e.g., in the arm rest. Nevertheless, at least some components of passenger service unit 121 should be accessible to the passenger seated in passenger seat 111, e.g., to adjust the direct and flow rate of ventilation 124, turn light 123, reach an oxygen mask of oxygen module 129 when deployed. For example, FIG. 1C illustrates oxygen module 129 with an oxygen mask in a deployed state, showing that the oxygen mask is deployed within the accessibility zone.

Referring to FIG. 1C, the position of passenger service unit 121, relative to passenger seat 111, determines accessibility of various components of passenger service unit 121. Furthermore, recline angle 195 of second passenger seat 112, relative to passenger seat 111, and the reline angle of second passenger seat 112 impacts this accessibility. Specifically, when second passenger seat 112 is reclined, the space in front of passenger seat 111 is reduced. Likewise, when passenger seat 111 is reclined, the passenger, seated in passenger seat 111, is further away from passenger service unit 121. In some examples, the position passenger service unit 121 is selected such that passenger service unit 121 remains accessible to the passenger, seated in passenger seat 111, regardless of the recline position of passenger seat 111 or the recline position of second passenger seat 112.

Figure 1D:
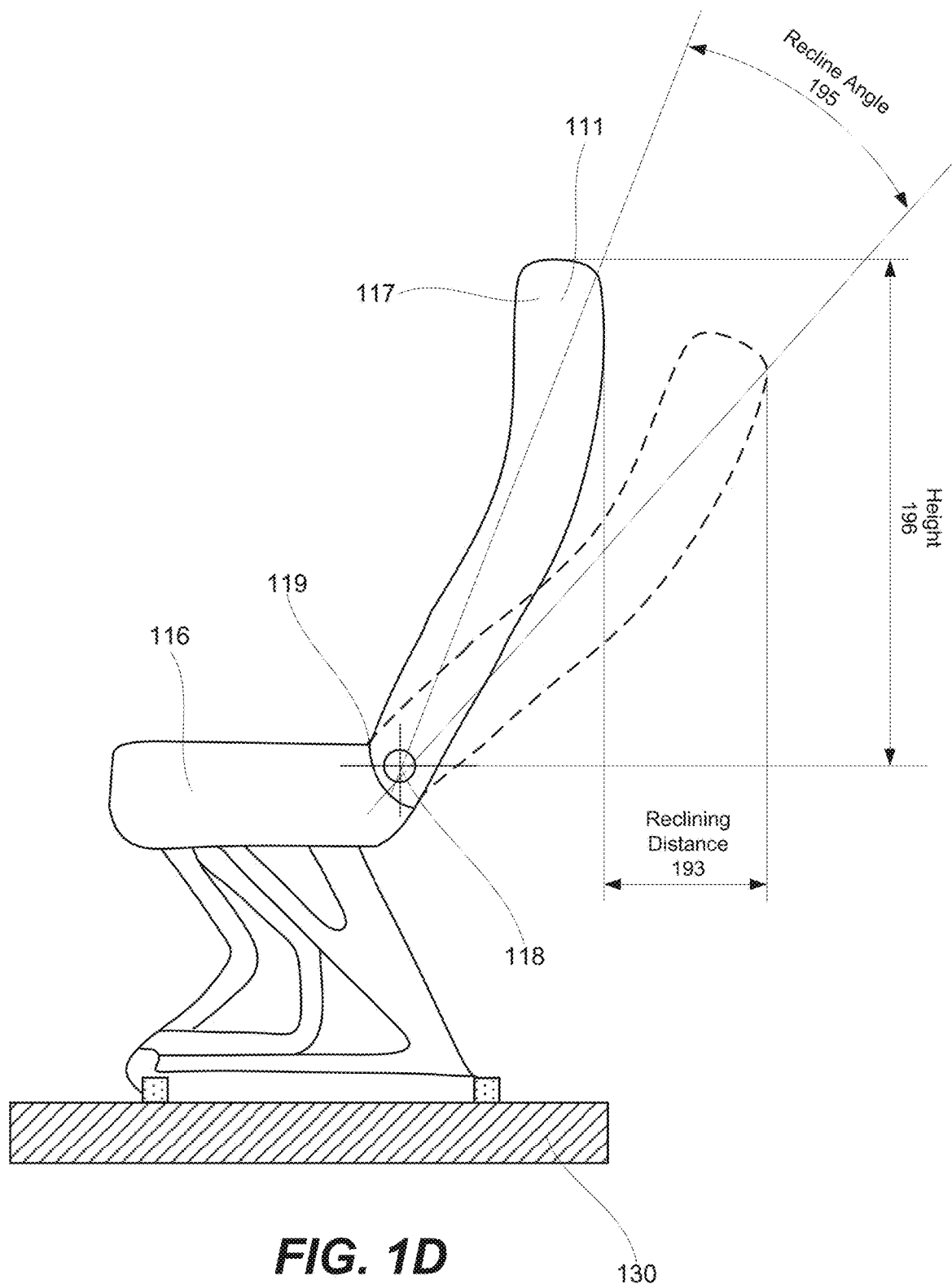
FIG. 1D is a schematic illustration of a passenger seat, illustrating the reclining angle and the reclining distance of this seat, in accordance with some examples.

FIG. 1D is a schematic illustration of passenger seat 111, illustrating various details of recline angle 195, height 196, and reclining distance 193. Specifically, passenger seat 111 comprises seat cushion 116 and back rest 117, which is able to recline relative to seat cushion 116 about reclining axis 118. Height 196 is measured in a vertical direction (perpendicular to seat rail 130) between reclining axis 118 and the top of back rest 117 when back rest 117 is not reclined. Reclining distance 193 is a horizontal distance (measured along seat rail 130) which the top of back rest 117 during the complete recline. Reclining distance 193 depends on both recline angle 195 and height 196 of back rest 117. Reclining distance 193 indirectly impacts accessibility of passenger service unit 121 by the passenger, seated in passenger seat 111. As noted above and briefly referring to FIG. 1C, when second passenger seat 112 is reclined, the space in front of passenger seat 111, available to access various features of passenger service unit 121, is reduced. As such, recline angle 195 is considered when determining position of passenger service unit 121 in overhead compartment 190.

FIG. 1D also illustrates seat cushion reference point 119, which is defined as an intersection of seat cushion 116 and back rest 117 or, more specifically, of passenger facing surfaces of seat cushion 116 and back rest 117. Unlike reclining axis 118, seat cushion reference point 119 is accessible and is used for positioning locating device 170 or, more specifically, for determining a reference in overhead compartment 190 when installing passenger service unit 121. In some examples, the position of seat cushion reference point 119 does not change when back rest 117 reclines relative to seat cushion 116.

Figure 2A:
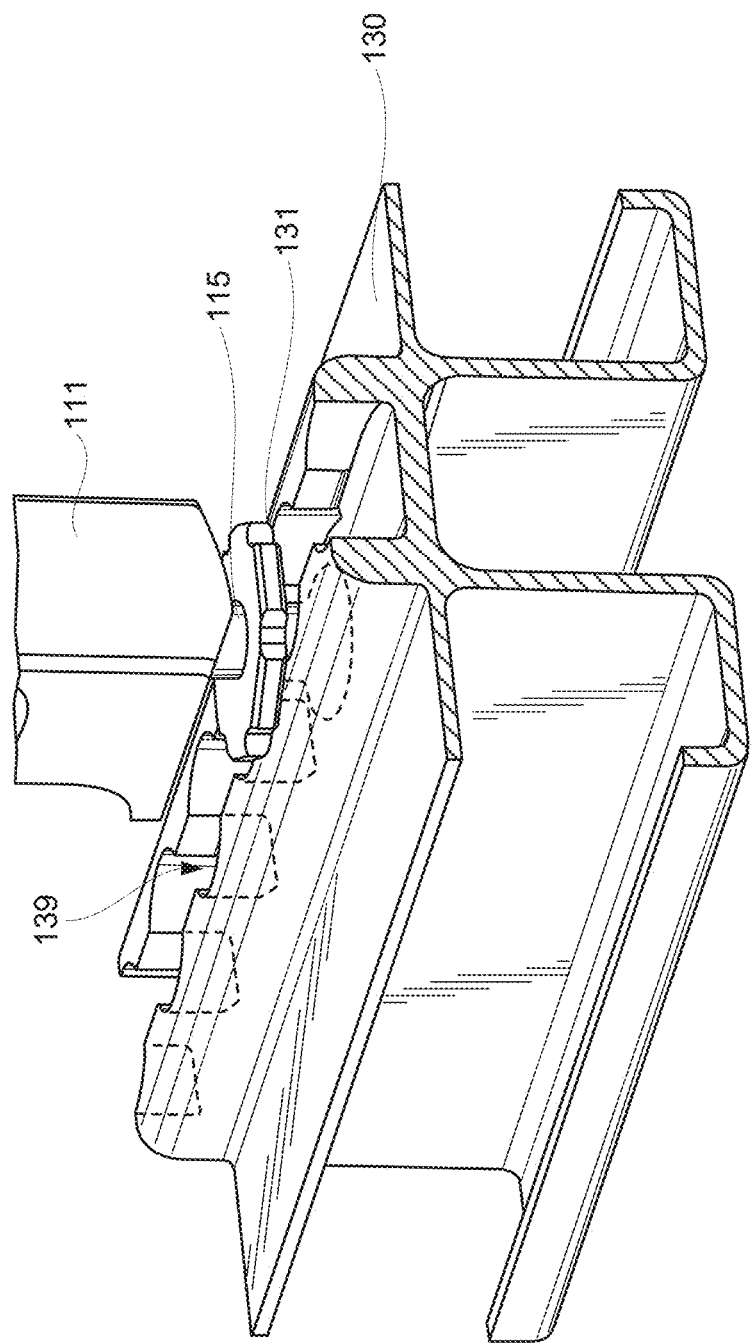
FIG. 2A is a schematic illustration of a seat rail supporting a seat, in accordance with some examples.

As noted above, passenger seat 111 is attached to and supported by seat rail 130. FIG. 2A is a schematic illustration of a bottom portion of passenger seat 111 and a portion of seat rail 130 showing this attachment. Specifically, passenger seat 111 comprises support fitting 115 is used for attachment. Seat rail 130 comprises receiver set 139, providing different position options for passenger seat 111. A receiver is defined as a channel in seat rail 130 extending between two adjacent openings able to receive support fitting 115. During installation and/or changing the position of passenger seat 111 (e.g., rearranging passengers seats in accordance with a new seating configuration), support fitting 115 protrudes in one of these openings and slid toward a receiver. For example, FIG. 2A illustrates support fitting 115 protruding through first receiver 131 after the installation.

Referring to FIGS. 2B and 2C, first receiver 131 is identified by first marker 141, which is a part of first marker set 140. First marker set 140 also comprises additional markers, such as third marker 143. Third marker 143 identifies third receiver 133 and is spaced apart from first marker 141 by first seat pitch 101. Overall, any two adjacent markers in first marker set 140 are spaced apart by first seat pitch 101. Therefore, when passenger seats are installed or repositioned on seat rail 130 in accordance with first marker set 140, the spacing between these seats will be equal to first seat pitch 101. First marker set 140 corresponds to one seating configuration.

Referring to FIGS. 2B and 2C, seat rail 130 also comprises second marker set 150. Any two adjacent markers of second marker set 150 are spaced apart by second seat pitch 102, which is different from first seat pitch 101. In these examples, seat pitch 102 is smaller than first seat pitch 101. Second marker set 150 corresponds to another seating configuration, different from the seating configuration identified by first marker set 140.

Second marker set 150 comprises second marker 151 and fourth marker 154. Referring to FIG. 2B, second marker 151 identifies second receiver 132, while fourth marker 154 identifies fourth receiver 134. In some examples, at least one marker of first marker set 140 and one marker of second marker set 150 identifies the same receiver. Referring to FIG. 2C, fourth marker 154 identifies third receiver 133, which is also identified by third marker 143 of first marker set 140. In this example, the pitch between any two adjacent markers of second marker set 150 is still different from that of first marker set 140.

Examples of Methods of Arranging Passenger Seats and Passenger Service Units

Figure 4:
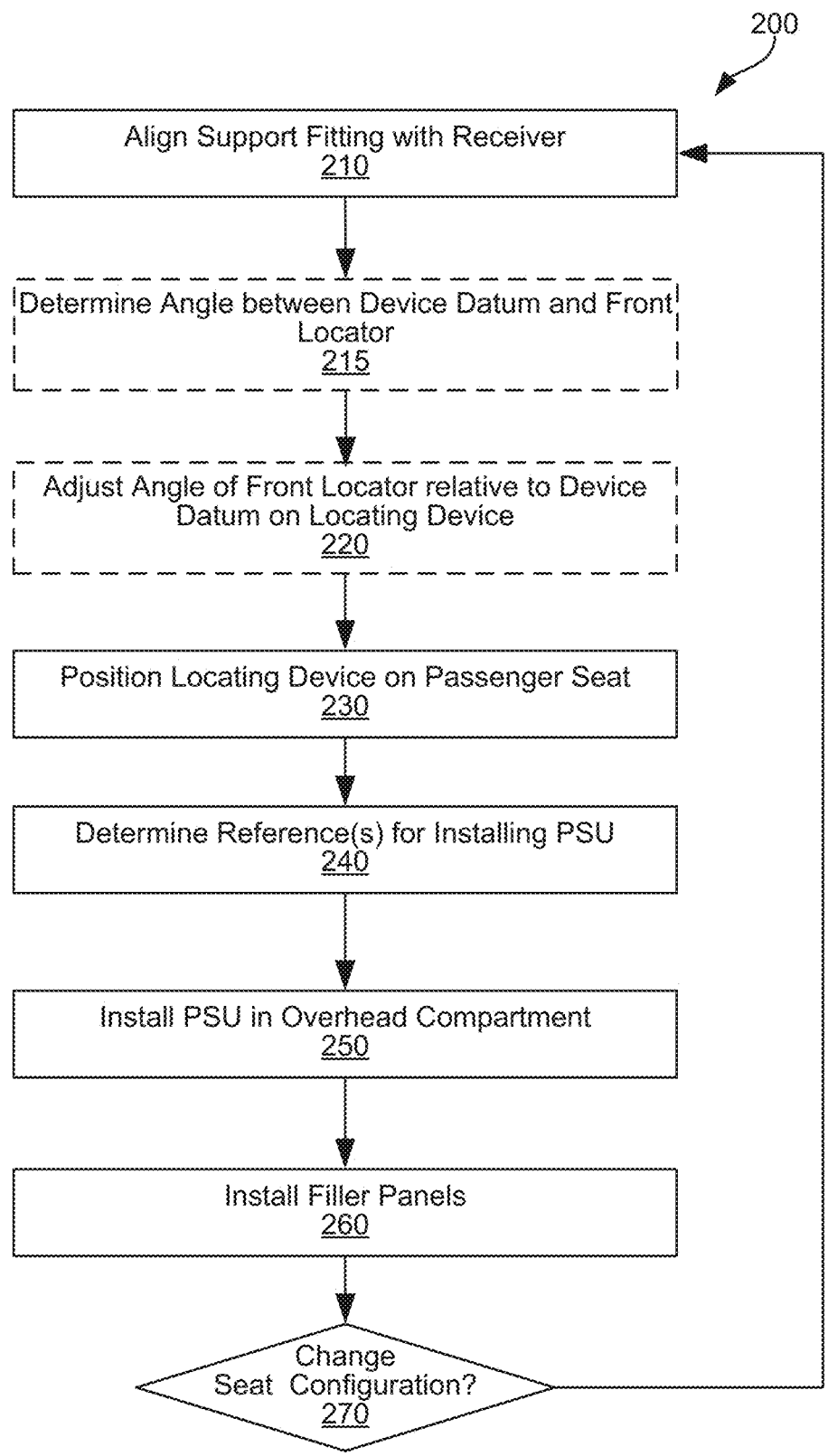
FIG. 4 is a process flowchart corresponding to a method for arranging passenger seats and passenger service units in an aircraft cabin, in accordance with some examples.

FIG. 4 is a process flowchart corresponding to method 200 for arranging a set of passenger seats 110 and a set of passenger service units 120 in aircraft cabin 100, in accordance with some examples. Various examples of these seating configurations are described above with reference to FIGS. 1A-IC. In some examples, different seating configurations have different seat pitches. Furthermore, the positon of each passenger service unit depends on the position of the corresponding passenger seat, to ensure accessibility of this passenger service unit. As such, in some examples, changing the position of a seat requires repositioning the corresponding passenger service unit.

In some examples, method 200 commences with aligning support fitting 115 of passenger seat 111 with first receiver 131 on seat rail 130 (block 210). First receiver 131 is a part of receiver set 139 as, for example, shown in FIGS. 2A-2C and described above. Seat rail 130 comprises first marker set 140, each identifying one receiver in receiver set 139, such that any two adjacent markers in first marker set 140 are spaced apart by first seat pitch 101. It should be noted that seat rail 130 also comprises second marker set 150, which is different from first marker set 140 as described above with reference to FIGS. 2B and 2C.

In some examples, the operation of aligning support fitting 115 with first receiver 131 also comprises attaching passenger seat 111 to seat rail 130. This attachment is schematically shown in FIG. 2A. In some examples, support fitting 115 comprises a nut, which, during installation, is tightened against seat rail 130. At least a portion of support fitting 115 protrudes into first receiver 131 after the attachment. Therefore, a top lip of seat rail 130, which defines receiver set 139, is compressed between portions of support fitting 115.

Some operations of method 200 are performed using locating device 170, shown in FIGS. 5A-6A and FIG. 7. Locating device 170 comprises device datum 176 and front locator 171. Front locator 171 forms angle 164 with device datum 176. In some examples, angle 164 is adjustable. In these examples, locating device 170 is reconfigurable. In one configuration, angle 164 is set to first angle 161, while in another configuration angle 164 is set to second angle 162. As such, front locator 171 is tiltable or rotatable relative to device datum 176. In some examples, first angle 161 and second angle 162 represent different seating configurations.

Figure 5A:
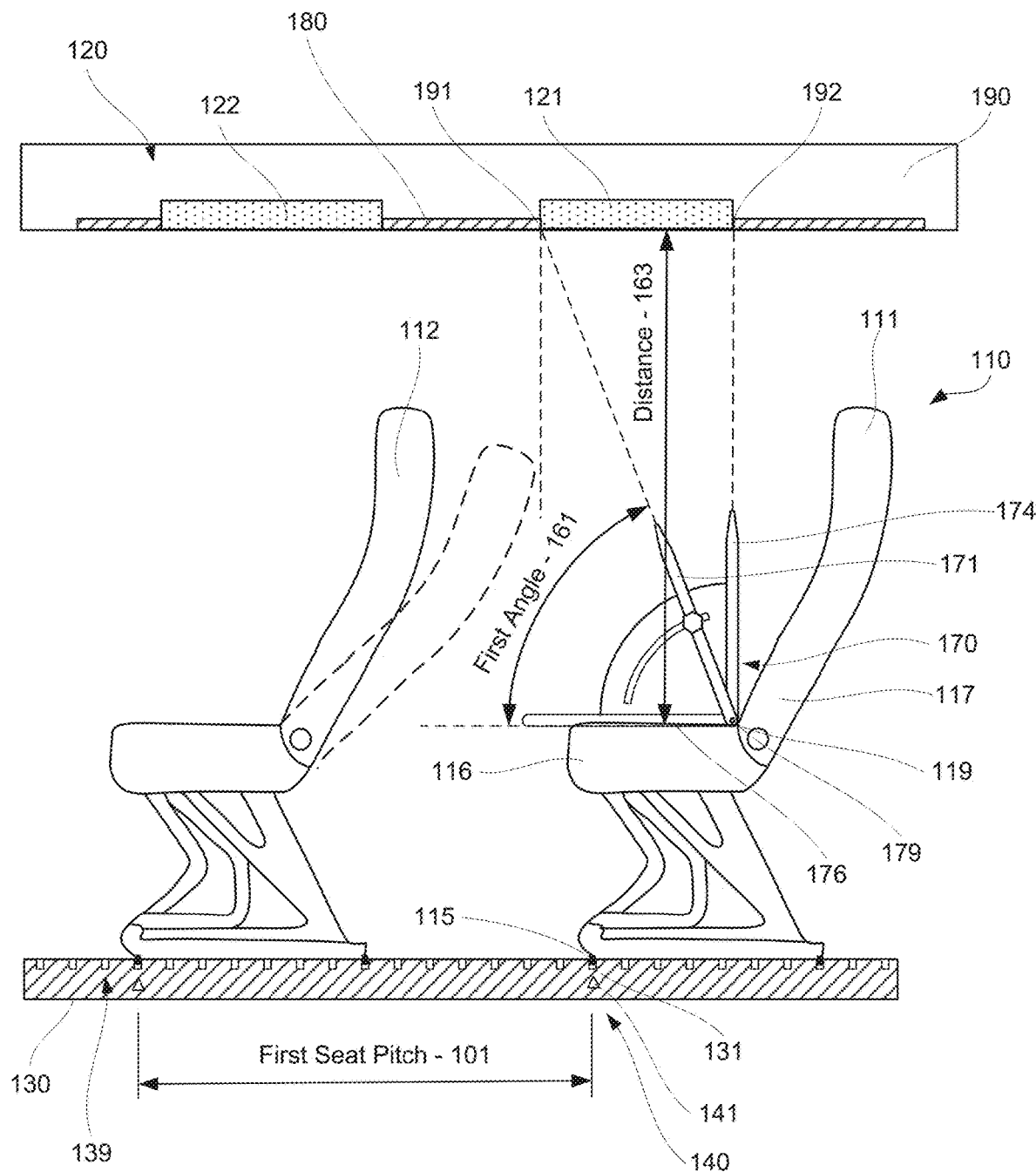
FIG. 5A is a schematic illustration of aligning a passenger service unit relative to the passenger seat using a locating device, in accordance with some examples.

In some examples, method 200 comprises determining first angle 161 between device datum 176 and front locator 171 of locating device 170 (block 215). Referring to FIG. 5A, first angle 161 is determined at least based on distance 163 between device datum 176 and passenger service unit 121 and further based on first seat pitch 101. For example, a larger angle is used when distance 163 is increased. This relationship ensures that passenger service unit 121 is not positioned too far ahead of passenger seat 111.

Furthermore, a larger angle is used when the seat pitch is decreased, e.g., first angle 161 is used for first seat pitch 101 while second angle 162 is used for second seat pitch 102. This correspondence ensures that passenger service unit 121 is not positioned over second seat 112, which is in front of passenger seat 111, as shown in FIG. 5A. For example, the value of first angle 161 is selected such that the oxygen mask does not interfere with the back rest of second seat 112 even when second seat 112 is reclined.

In some examples, the value of first angle 161 is further selected based on height 196 of back rest 117 of passenger seat 111 and recline angle 195 of back rest 117. As described above, passenger seat 111 and second passenger seat 112 have the same size and function. As such, height 196 of back rest 117 of passenger seat 111 is the same as that of second passenger seat 112. Similarly, recline angle 195 of back rest 117 of passenger seat 111 is the same as that of second passenger seat 112. Reclining the back rest of second passenger seat 112 determines the space available for accessing passenger service unit 121 corresponding to passenger seat 111. This space will depend on the height of the back rest of second passenger seat 112 and the recline angle of that back rest. Since this height and reclining angle are the same for passenger seat 111 and second passenger seat 112, the characteristics of passenger seat 111 (rather than the characteristics of second passenger seat 112) are used, in some examples, for determining the position of passenger service unit 121 relative to passenger seat 111 or, more specifically, the value of first angle 161.

As noted above and shown in FIG. 5B, angle 164, between device datum 176 and front locator 171 of locating device 170, is adjustable. This feature allows using locating device 170 for different types of seats, seat pitches, and aircraft cabins. In some examples, method 200 comprises adjusting angle 164 between device datum 176 and front locator 171 (block 220). For examples, the value of first angle 161, determined during operation represented by block 215 and described above, is used to reconfigure locating device 170.

Method 200 comprises positioning locating device 170 on passenger seat 111 (block 230) as, for example, is shown in FIG. 5A. At the end of this operation, device reference point 179 of locating device 170 coincides with seat cushion reference point 119 of passenger seat 111. At this point, rear locator 174 is positioned against back rest 117 of passenger seat 111. Furthermore, device datum 176 of locating device 170 is positioned against seat cushion 116 and in contact with seat cushion 116 as, shown in FIG. 5A. Overall, this operation establishes spatial reference between locating device 170 on passenger seat 111. Passenger seat 111 is tilted or not tilted during this operation.

Method 200 proceeds with determining first front reference 191 in overhead compartment 190 (block 230). First front reference 191 is used for positioning passenger service unit 121, during installation of passenger service unit 121. In some examples, first front reference 191 corresponds to the front edge of passenger service unit 121 as, for example, shown in FIG. 5A. Alternatively, first front reference 191 corresponds to a specific feature of passenger service unit 121, e.g., a component of passenger service unit 121.

First front reference 191 is determined relative to seat cushion reference point 119 such that various components of passenger service unit 121 are within reach of passenger in passenger seat 111. Referring to FIG. 5A, first front reference 191 depends on first angle 161 between device datum 176 and front locator 171. As described above, first angle 161 is selected based on distance 163 between device datum 176 and passenger service unit 121 and further based on first seat pitch 101.

Determining first front reference 191 is performed using front locator 171 of locating device 170. In some examples, front locator 171 is equipped with laser pointer 172 (shown in FIG. 5B), which projects a light to overhead compartment 190. The light point on the surface of overhead compartment 190 identifies first front reference 191. In some examples, the light point is continuously present during installation of passenger service unit 121. Alternatively, front locator 171 is equipped with extendable arm 173 (shown in FIG. 5C). During this operation, extendable arm 173 extends to overhead compartment 190 and either contact overhead compartment 190 at first front reference 191 or simply points first front reference 191 at overhead compartment 190. In some examples, in order to retract extendable arm 173, an installer adds a marking, identifying first front reference 191.

In some examples, method 200 further comprises determining first rear reference 192 in overhead compartment 190 (block 240). This operation is performed using rear locator 174 of locating device 170. Similar to first front reference 191, first rear reference 192 is used during installation of passenger service unit 121. For example, passenger service unit 121 is positioned between first front reference 191 and first rear reference 192. In specific examples, first front reference 191 corresponds to the front edge of passenger service unit 121, while first rear reference 192 corresponds to the rear edge of passenger service unit 121 as shown in FIG. 5A. A combination of first front reference 191 and first rear reference 192 is used for more precise positioning of passenger service unit 121.

In some examples, angle 165 between device datum 176 and rear locator 174 is fixed. For example, when locating device 170 is positioned on passenger seat 111 as shown in FIG. 5A, such that device reference point 179 coincides with seat cushion reference point 119 and such that device datum 176 is in contact with seat cushion 116, rear locator 174 is substantially vertical, e.g., substantially perpendicular to seat rail 130, e.g., at an angle of between 80° and 100° or more specifically between 85° and 95°. Therefore, the distance between device datum 176 and overhead compartment 190 does not have major impact on the position of first rear reference 192. In some examples, angle 165 between device datum 176 and rear locator 174 is determined based on type of passenger seat 111.

Referring to FIG. 5A, in some examples, rear locator 174 is positioned against back rest 117 of passenger seat 111 when device reference point 179 coincides with seat cushion reference point 119 and, also, when device datum 176 is positioned against seat cushion 116. For example, sliding device datum 176 on seat cushion 116 until rear locator 174 is pressed against back rest 117 is used to ensure that when device reference point 179 coincides with seat cushion reference point 119.

Referring to FIG. 4, method 200 further comprises installing passenger service unit 121 in overhead compartment 190 (block 250). This operation is performed at least in accordance with first front reference 191. For example, the front edge of passenger service unit 121 is aligned with first front reference 191. In some embodiments, first rear reference 192 is also used during this operation. Passenger seat 111 is already attached to and not movable relative to seat rail 130 during this operation. In some embodiments, the installation of passenger service unit 121 is performed while first front reference 191 is maintained using locating device 170 as, for example, shown in FIG. 5A.

Figure 6A:
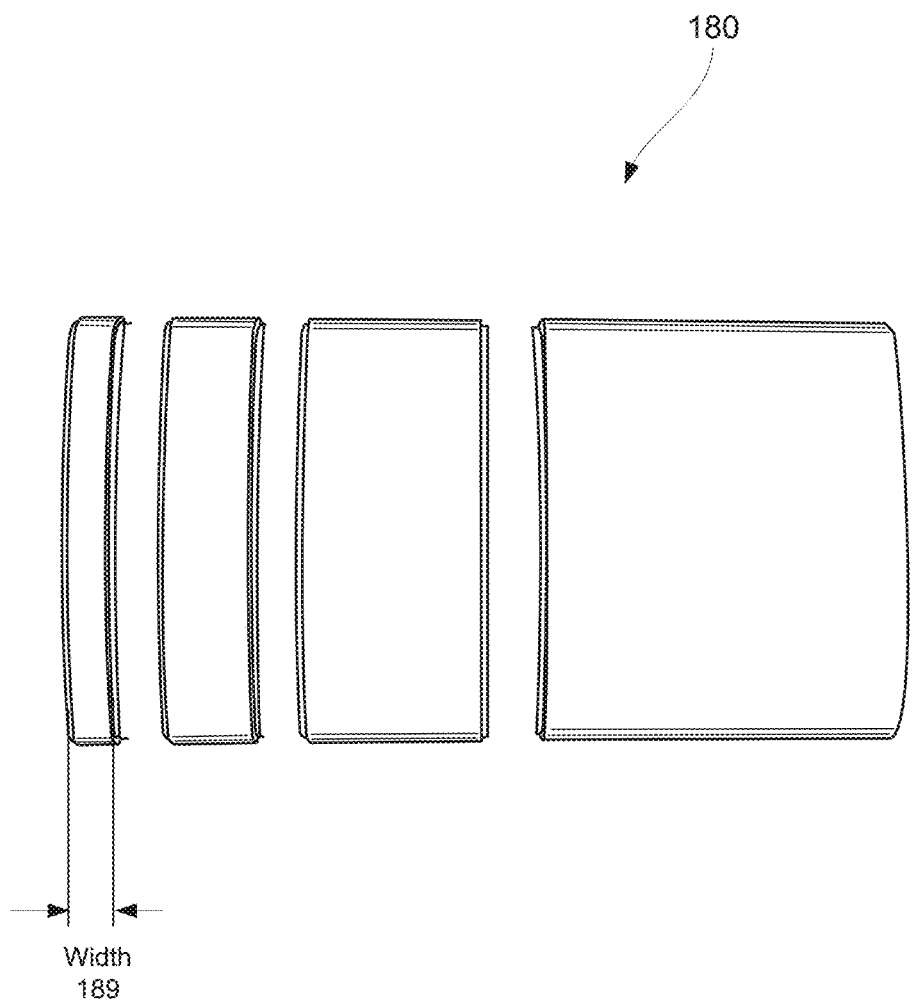
FIG. 6A is a schematic illustration of a set comprising multiple filler panels having different widths.

Referring to FIG. 4, method 200 further comprises installing one or more filler panels 180 (block 260). One or more filler panels 180 are positioned between passenger service unit 121 and second passenger service unit 122 as shown in FIG. 5A. Specifically, second passenger service unit 122 is adjacent to passenger service unit 121. The gap between passenger service unit 121 and second passenger service unit 122 is filled with one or more filler panels 180. It should be noted that the gap depends on the seat pitch and the length of passenger service unit 121 and second passenger service unit 122. As such, the gap between passenger service unit 121 and second passenger service unit 122 will be different seat pitches, such as first seat pitch 101 and second seat pitch 102. To accommodate this gap variation and to ensure that the entire gap is covered, filler panels 180 are supplied as a kit comprising different width panels. One example of such a kit is shown in FIG. 6A.

Figure 6B:
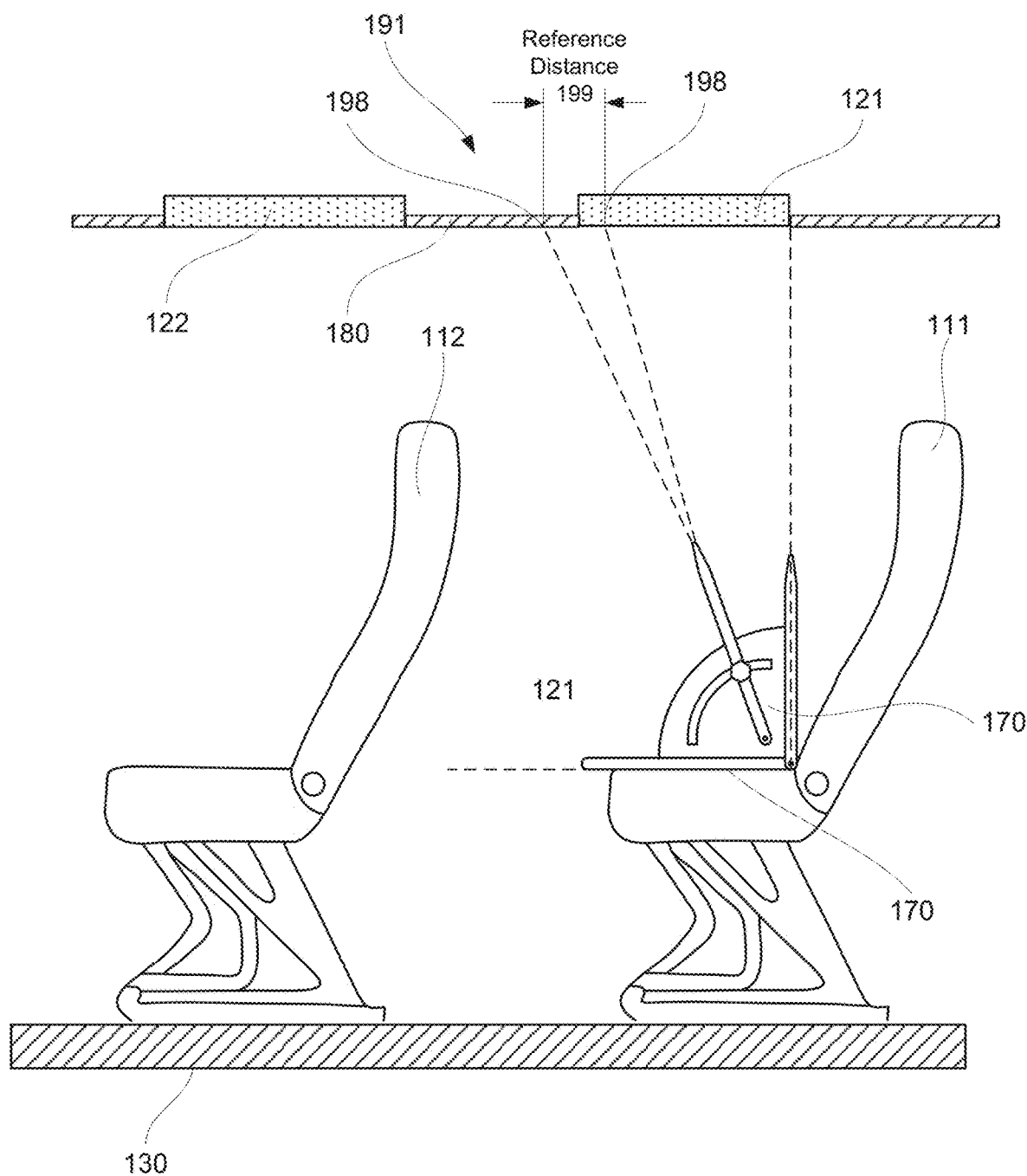
FIG. 6B is a schematic illustration of aligning a passenger service unit relative to the passenger seat using a locating device, which provides two front reference points from the front locator of the locating device.

Referring to FIG. 6B, in some examples, first front reference 191 comprises two reference points 198, separated by reference distance 199. Reference distance 199 provides a range for positioning passenger service unit 121, e.g., to overcome obstacles in overhead compartment 190. In specific examples, this range is used for positioning the front edge of passenger service unit 121 during installation of passenger service unit 121. This range provides flexibility in installation and to ensure that the entire gap between passenger service unit 121 and second passenger service unit 122 is filled with one or more filler panels 180. Specifically, filler panels 180 have specific widths and can accommodate some specific examples but not all sizes of the gap. Having an installation range for passenger service unit 121 ensures that the selected gap is filled completely. In some examples, reference distance 199 is greater than width 189 of the narrow-most filler panel of one or more filler panels 180 thereby ensuring the complete fill of the gap.

In some examples, the seating configuration in aircraft cabin 100 needs to be changed (block 270 in FIG. 4). For example, passenger seat 111 and second passenger seat 112 are initially installed using first seat pitch 101 between the seats. A new configuration uses second seat pitch 102 between the seats. As noted above, seat rail 130 comprises second marker set 150, corresponding to second seat pitch 102.

In order to change the seating configuration, operations of method 200 corresponding to blocks 210-260 are repeated. These operations are performed in a manner similar to the one described above. However, the passenger seats and passenger service units are placed into new positions. Specifically, the passenger seats are positioned in accordance with second marker set 150, while the passenger service units are positioned in accordance with the new position of the seats.

Figure 7:
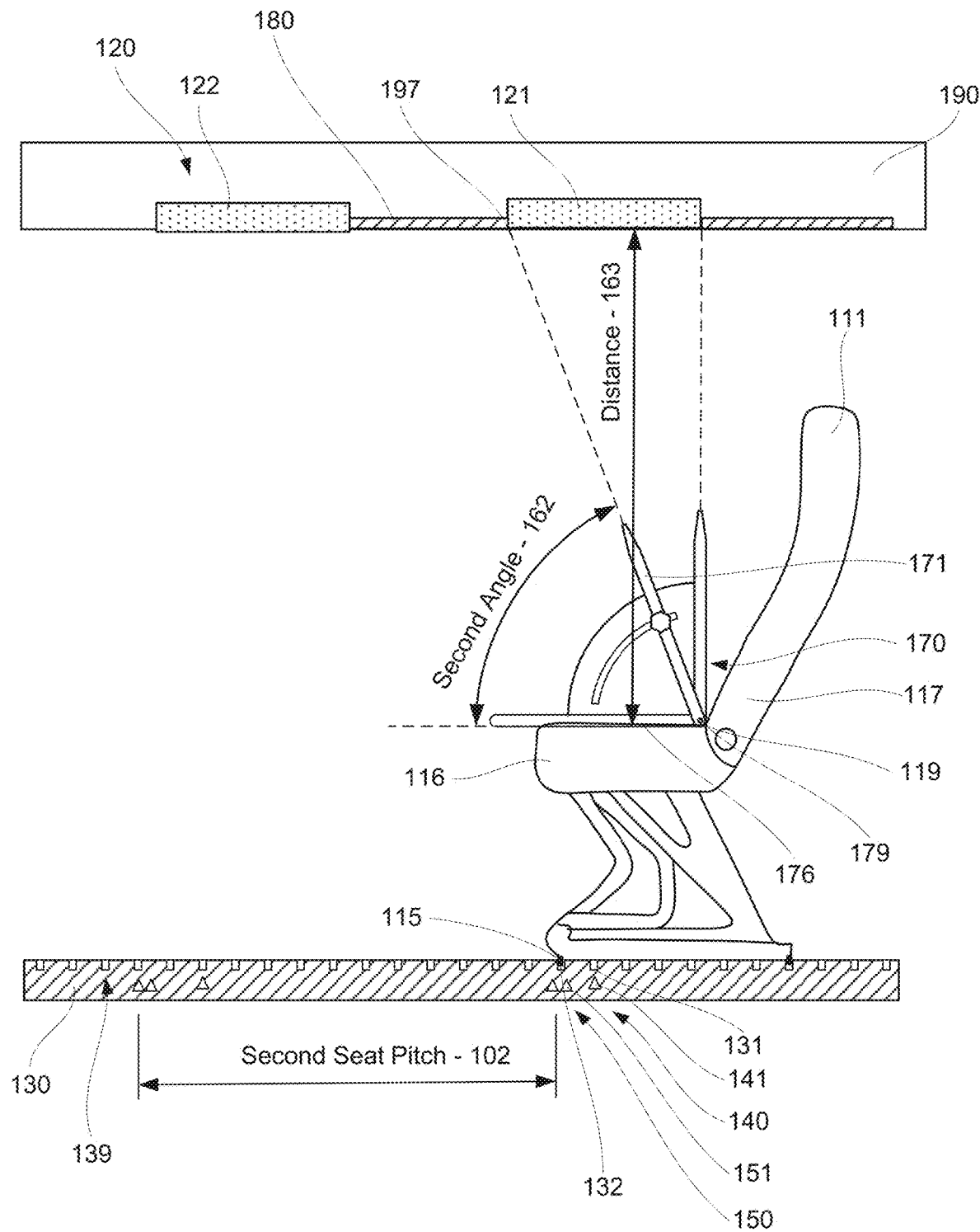
FIG. 7 is a schematic illustration of positioning a passenger seat in accordance with a second set of markers and aligning a passenger service unit relative to this passenger seat, in accordance with other examples.

Specifically, method 200 comprises aligning support fitting 115 of passenger seat 111 with second receiver 132 of receiver set 139 on seat rail 130 (repeating block 210 in accordance with second marker set 150). FIGS. 2A, 2B, and 7 illustrate second receiver 132 being identified by second marker 151 of second marker set 150. Method 200 proceeds with positioning locating device 170 on passenger seat 111 (repeating block 230) such that device reference point 179 coincides with seat cushion reference point 119 of passenger seat 111. Furthermore, device datum 176 is positioned on seat cushion 116 and in contact with seat cushion 116. It should be noted that this operation is performed while support fitting 115 is aligned with second receiver 132. In fact, support fitting 115 is attached to seat rail 130 at this location.

Method 200 then proceeds with determining second front reference 197 in overhead compartment 190 (repeating block 240). As described above, this operation is performed using locating device 170. Second front reference 197 is determined in a manner similar to first front reference 191. However, passenger seat 111 is positioned in accordance with second marker set 150 during this operation. Therefore, unless second receiver 132 is the same as first receiver 131 on seat rail, second front reference 197 will likely be at a different location than first front reference 191.

In some examples, second front reference 197 is determined using second angle 162 between device datum 176 and front locator 171. Second angle 162 is selected based on distance 163 between device datum 176 and passenger service unit 121 and further based on second seat pitch 102. In some examples, second angle 162 is the same as first angle 161. Alternatively, second angle 162 is different from first angle 161.

Finally, method 200 proceeds with installing passenger service unit 121 in overhead compartment 190 at least in accordance with second front reference 197 (repeating block 250) and installing filler panels 180 (repeating block 260). In some examples, the set of filler panels 180 corresponding second seat pitch 102 is different form the set of filler panels 180 corresponding to first seat pitch 101.

In some examples, changing the seating configuration also triggers one or more optional operations depicted by blocks 215 and 220 and described above.

Examples of Locating Tools and Kits

Figure 5B:
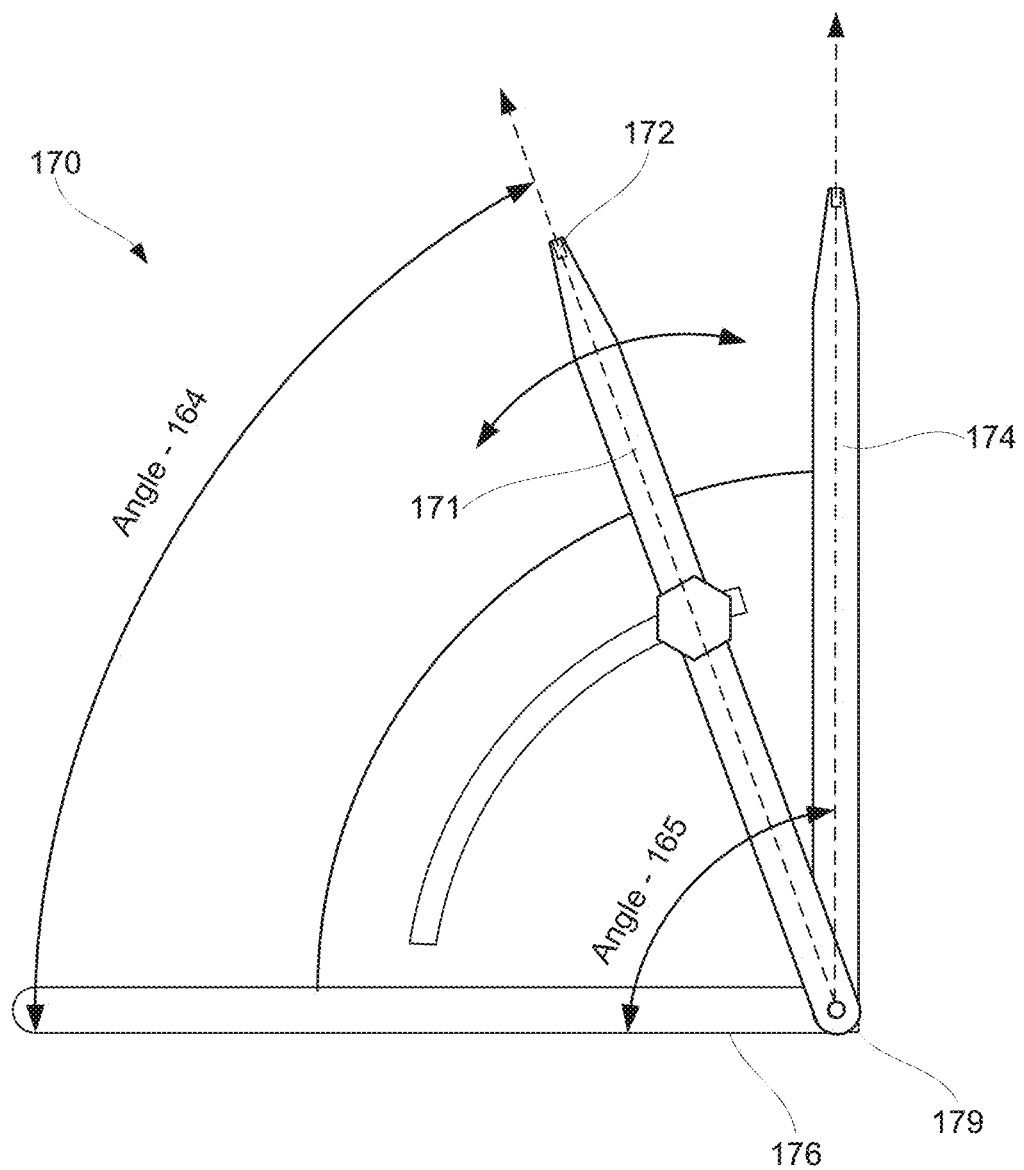
FIG. 5B is a schematic illustration of one example of the locating device.
Figure 5C:
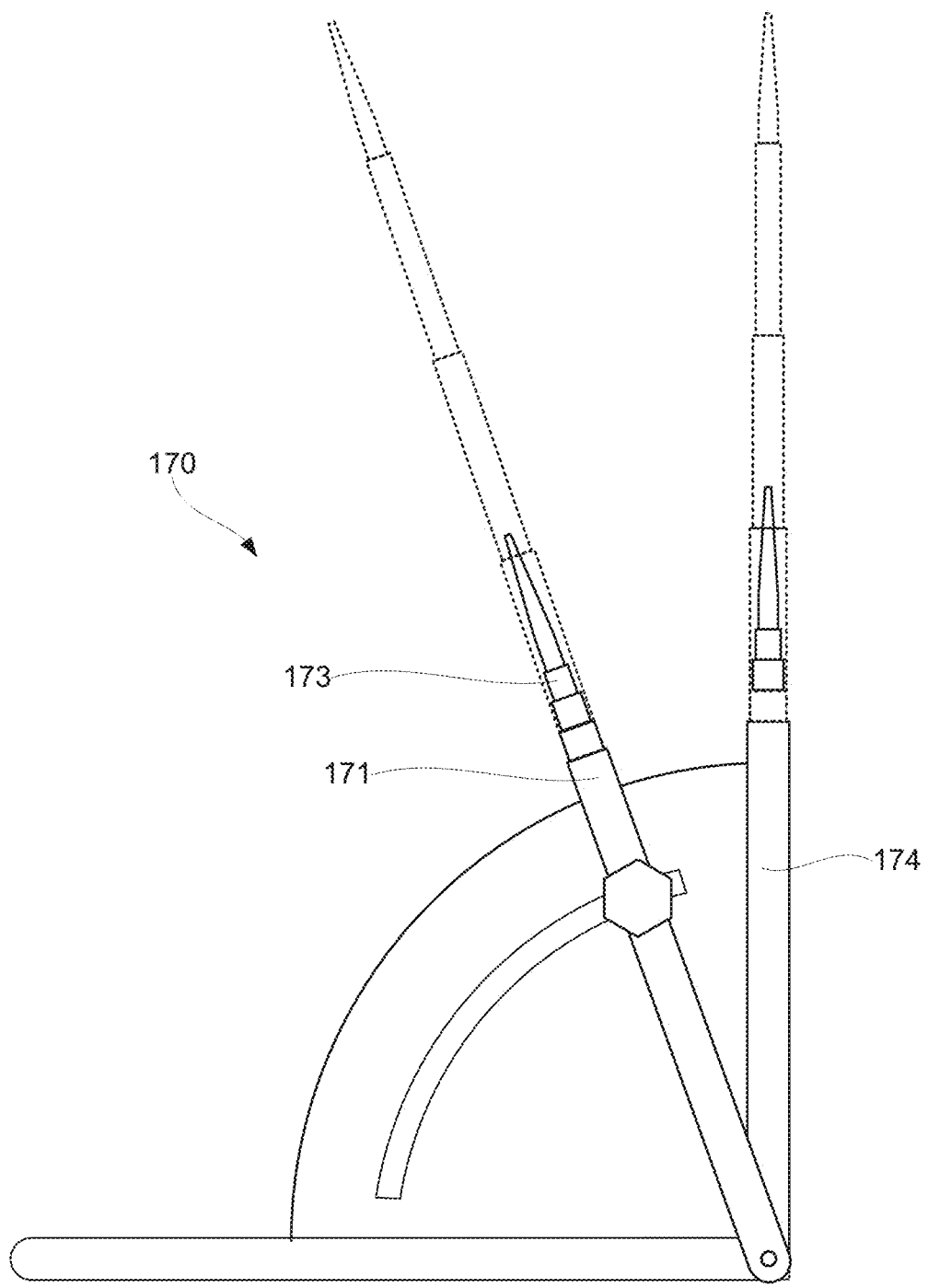
FIG. 5C is a schematic illustration of another example of the locating device.
Figure 5D:
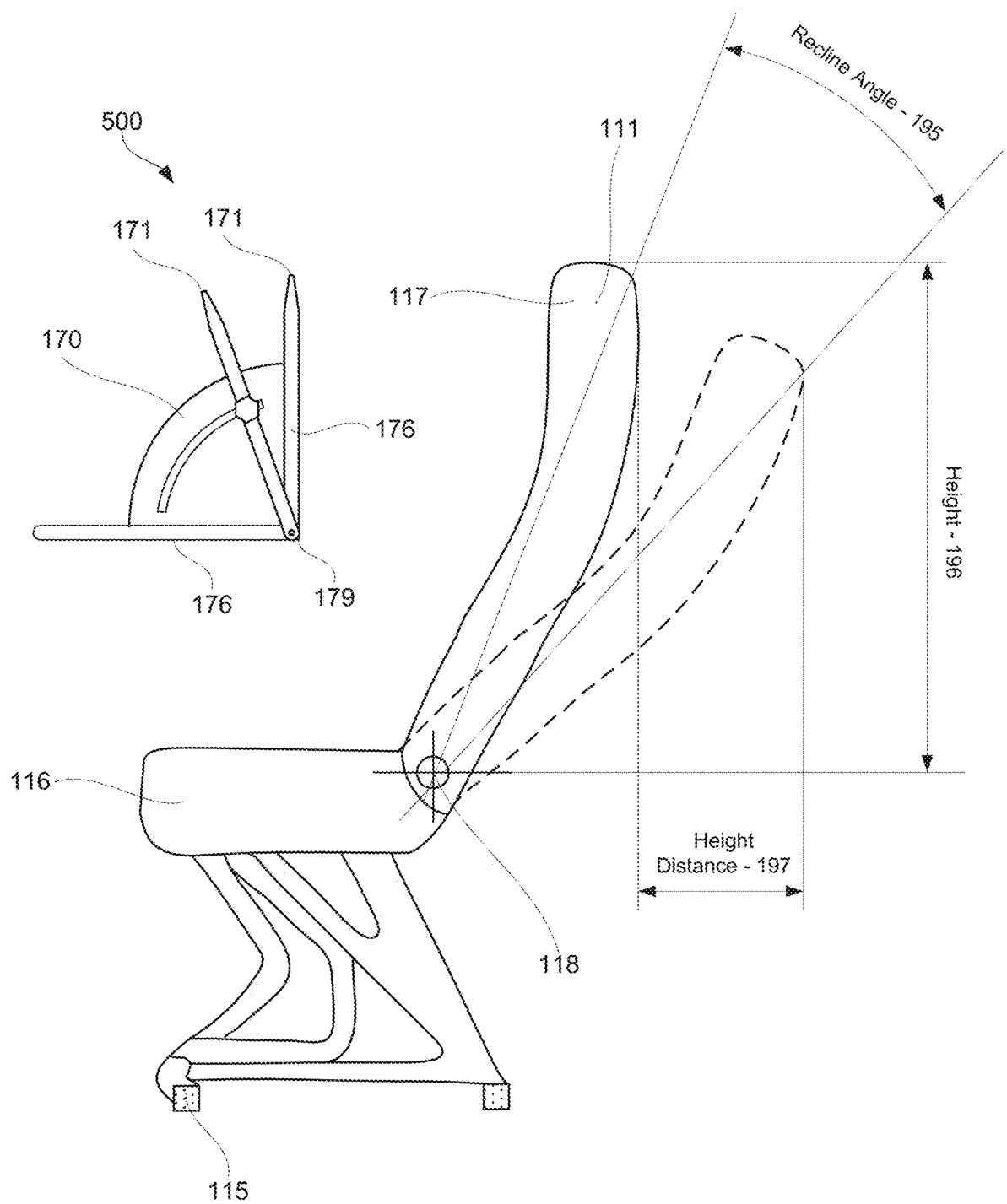
FIG. 5D is a schematic illustration of a kit comprising a locating device and a passenger seat.

Various operations of method 200, described above, are performed using locating device 170. In some examples, locating device 170 is supplied as a standalone component as shown in FIGS. 5B and 5C. Alternatively, locating device 170 is supplied as a part of kit, which also includes one or more passenger seats 110. FIG. 5D illustrates one example of kit 500, comprising locating device 170 and passenger seat 111. In either case, locating device 170 is configured to operate with a particular type of passenger seats and in a particular aircraft cabin. In some examples, locating device 170 is designed to change the configuration for a new seat type, a new cabin type, and/or a new seat pitch. Overall, locating device 170 is used for determining positions of passenger service units relative to corresponding passenger seats in aircraft cabins.

Referring to FIGS. 5A-5D, locating device 170 comprises device datum 176, front locator 171, and device reference point 179. Device datum 176 is used for positioning on and being in contact with seat cushion 116 of passenger seat 111 as, for example, is shown in FIG. 5A. In some examples, device datum 176 is shaped to conform to the surface of seat cushion 116. The correspondence of these shapes is used, in part, to control position of device datum 176 on seat cushion 116. Alternatively, device datum 176 is straight to accommodate different types of seats.

Front locator 171 is connected and positioned at angle 164 relative to device datum 176. In some examples, angle 164 is fixed and corresponds to a specific seat type, cabin type, and/or seat pitch. Alternatively, angle 164 is adjustable and can be selected based on a specific seat type, cabin type, and/or seat pitch. In other words, one locating device 170 is used for different seat types, cabin types, and/or seat pitches.

Front locator 171 is configured to determine first front reference 191 in overhead compartment 190. For example, front locator 171 is equipped with laser pointer 172 as shown in FIG. 5B or extendable arm 173 as shown in FIG. 5C. These features ensure that locating device 170 is compact (e.g., less than 0.5 meters in size or even less than 0.3 meters) and is still able to precisely determine first front reference 191 in overhead compartment 190. It should be noted that, in some examples, overhead compartment 190 is more than 1 meter or even 1.5 meters away from seat cushion 116, which supports device datum 176 during operation of locating device 170.

Device reference point 179 is identified by at least one of device datum 176 or front locator 171 as, for example, is shown in FIGS. 5A and 5B. Device reference point 179 is configured to coincide with seat cushion reference point 119 of passenger seat 111 when device datum 176 of locating device 170 is positioned on and in contact with seat cushion 116 of passenger seat 111 as, for example, is shown in FIG. 5A.

In some examples, locating device 170 further comprises rear locator 174 as, for example, is shown in FIGS. 5A and 5B. Rear locator 174 is connected to device datum 176 and front locator 171 and configured to determine first rear reference 192 in overhead compartment 190. As described above, first rear reference 192 is used in combination with first front reference 191 to precisely position passenger service unit 121. In some examples, the distance between first front reference 191 and first rear reference 192 are substantially equal to a length of passenger service unit 121. Angle 165 between device datum 176 and rear locator 174 is fixed.

Aircraft and Spacecraft Examples

Figure 8:
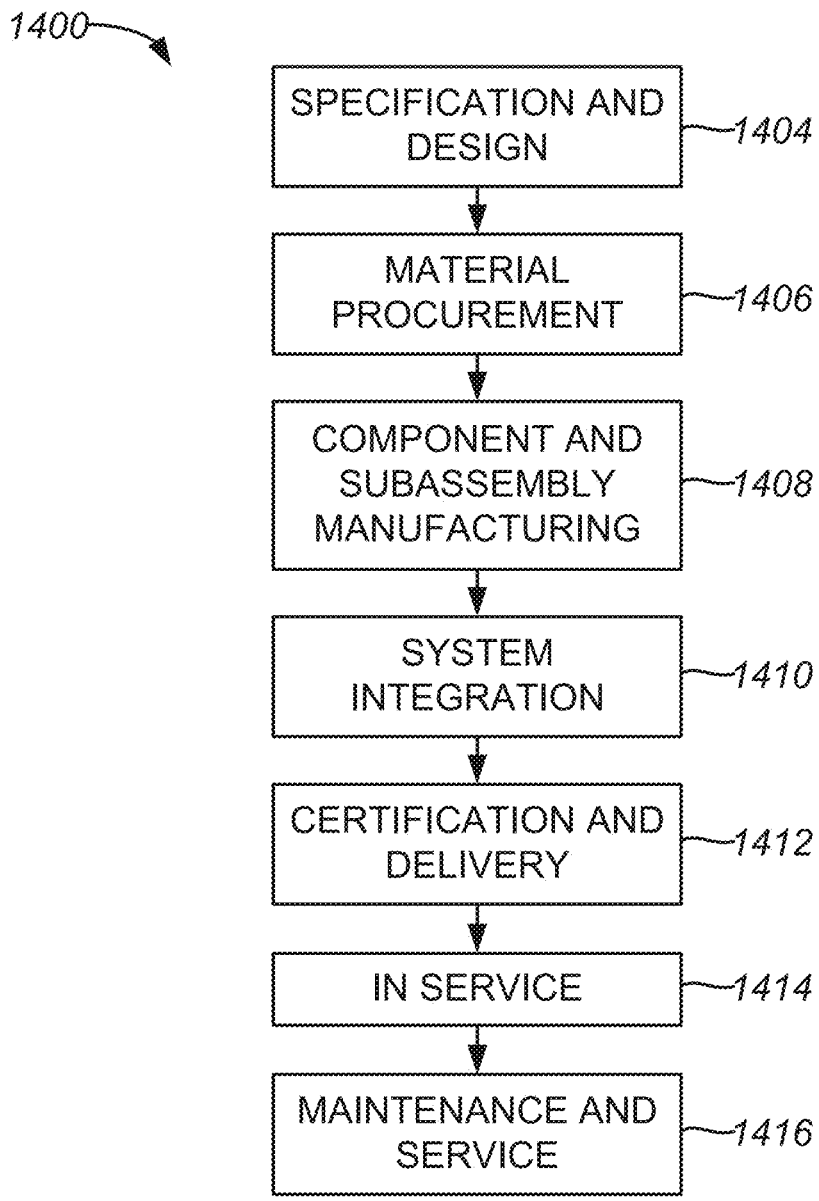
FIG. 8 is a process flowchart corresponding to a method for manufacturing and service the aircraft.
Figure 9:
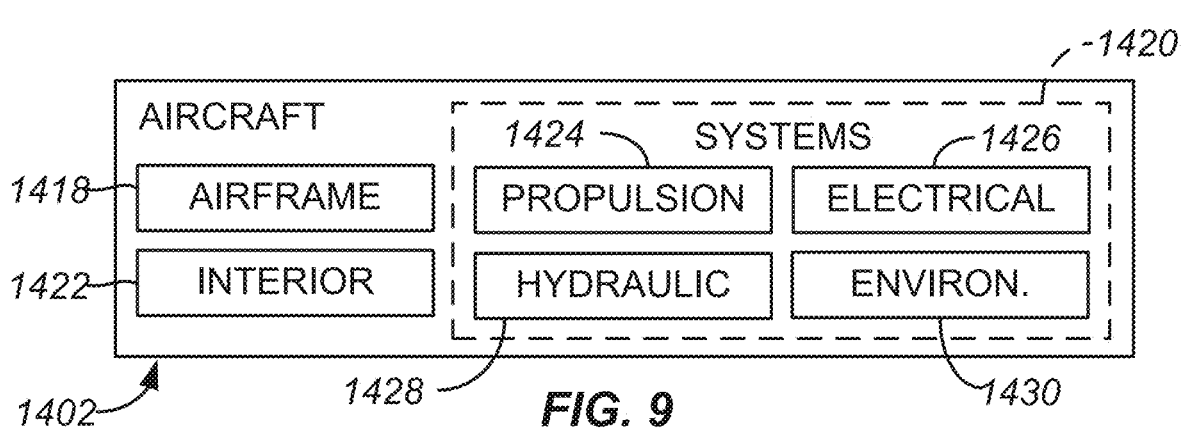
FIG. 9 illustrates a block diagram of an example of an aircraft, in accordance with some examples.

As discussed above, various examples of method 200 for arranging passenger seats 110 and locating device 170, used in method 200, disclosed herein are used on aircraft 1402. Accordingly, the manufacture of method 200 is described in the context of an aircraft manufacturing and service method 1400 as shown in FIG. 8 and aircraft 1402 as shown in FIG. 9. During pre-production, illustrative method 1400 may include specification and design 1404 of aircraft 1402 and material procurement 1406. During production, component and subassembly manufacturing stages 1408 and system integration stage 1410 of aircraft 1402 takes place. Thereafter, aircraft 1402 may go through certification and delivery 1412 in order to be placed in service 1414. While in service by a customer, aircraft 1402 is scheduled for routine maintenance and service 1416 (which may also include modification, reconfiguration, refurbishment, and so on).

Each of the processes of method 1400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, aircraft 1402 produced by illustrative method 1400 may include an airframe 1418 with plurality of systems 1420 and interior 1422. Examples of high-level systems 1420 include one or more of a propulsion system 1424, an electrical system 1426, a hydraulic system 1428, and an environmental system 1430. Although an aerospace example is shown, the principles of the examples described herein may be applied to other industries.

Devices and methods embodied herein may be employed during any one or more of the stages of method 1400. For example, components or subassemblies corresponding to stages 1408 and 1410 may be fabricated or manufactured in a manner similar to components or subassemblies produced while aircraft 1402 is in service. Also, one or more device examples, method examples, or a combination thereof may be utilized during stages 1408 and 1410, for example, by substantially expediting assembly of or reducing the cost of an aircraft 1402. Similarly, one or more of device examples, method examples, or a combination thereof may be utilized while aircraft 1402 is in service, for example and without limitation, to maintenance and service 1416.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices.

Accordingly, the present examples are to be considered as illustrative and not restrictive.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A method for arranging a set of passenger seats, comprising a passenger seat, and a set of passenger service units, comprising a passenger service unit; in an aircraft cabin; comprising a seat rail, the method comprising:
   aligning a support fitting of the passenger seat with a first receiver of a receiver set on the seat rail,
      wherein the seat rail comprises a first marker set, each identifying one receiver in the receiver set such that any two adjacent markers in the first marker set are spaced apart by a first seat pitch, and
      wherein the first receiver is identified by a first marker of the first marker set;
   positioning a locating device on the passenger seat such that a device reference point of the locating device coincides with a seat cushion reference point of the passenger seat and such that a device datum of the locating device is positioned on and in contact with a seat cushion of the passenger seat; and
   using a front locator of the locating device, determining a first front reference in an overhead compartment for installing the passenger service unit, corresponding to the passenger seat,
      wherein the first front reference depends on a first angle between the device datum and the front locator, and
      wherein the first angle is selected based on a distance between the device datum and the passenger service unit and further based on the first seat pitch.

2. The method of claim 1, wherein an angle between the device datum and the front locator is adjustable.

3. The method of claim 2, further comprising adjusting the angle between the device datum and the front locator.

4. The method of claim 1, further comprising determining the first angle at least based on the distance between the device datum and the passenger service unit and further based on the first seat pitch.

5. The method of claim 1, wherein the first angle between the device datum and the front locator is further selected based on a height of a back rest of the passenger seat and a recline angle of the back rest.

6. The method of claim 1, wherein the front locator comprises one of a laser pointer or an extendable arm.

7. The method of claim 1, further comprising, using a rear locator of the locating device, determining a first rear reference in the overhead compartment for positioning the passenger service unit, wherein the passenger service unit is positioned between the first front reference and the first rear reference.

8. The method of claim 7, wherein an angle between the device datum and the rear locator is fixed.

9. The method of claim 8, wherein the angle between the device datum and the rear locator is determined based on a type of the passenger seat.

10. The method of claim 7, wherein the rear locator is positioned against a back rest of the passenger seat while the device reference point of the locating device coincides with the seat cushion reference point and the device datum is positioned against the seat cushion of the passenger seat.

11. The method of claim 1, further comprising, installing the passenger service unit in the overhead compartment at least in accordance with the first front reference.

12. The method of claim 11, wherein a front edge of the passenger service unit is aligned with the first front reference.

13. The method of claim 11, further comprising installing one or more filler panels, such that the one or more filler panels are positioned between the passenger service unit and a second passenger service unit, adjacent to the passenger service unit.

14. The method of claim 13, wherein the first front reference comprises two reference points, separated by a reference distance.

15. The method of claim 14, wherein the reference distance is greater than a width of a narrow-most filler panel of the one or more filler panels.

16. The method of claim 15, wherein at least two of the one or more filler panels have different widths.

17. The method of claim 1, wherein the seat rail comprises a second marker set, each identifying one receiver in the receiver set such that any two adjacent markers in the second marker set are spaced apart by a second seat pitch, different from the first seat pitch.

18. The method of claim 17, further comprising:
aligning the support fitting of the passenger seat with a second receiver of the receiver set on the seat rail,
    wherein the second receiver is identified by a second marker of the second marker set;
positioning the locating device on the passenger seat such that the device reference point of the locating device coincides with the seat cushion reference point of the passenger seat and such that the device datum of the locating device (170 is positioned on and in contact with the seat cushion of the passenger seat; and
using the front locator of the locating device, determining a second front reference in the overhead compartment for installing the passenger service unit, corresponding to the passenger seat,
    wherein the second front reference is determined by a second angle between the device datum and the front locator,
    wherein the second angle is selected based on a distance between the device datum and the passenger service unit and further based on the second seat pitch.

19. The method of claim 18, wherein the second angle is different from the first angle.

20. The method of claim 19, further comprising, installing the passenger service unit in the overhead compartment at least in accordance with the second front reference.

* * * * *